(12) United States Patent
Schmidt et al.

(10) Patent No.: US 7,267,448 B2
(45) Date of Patent: Sep. 11, 2007

(54) ELLIPSOID VEHICULAR MIRROR

(75) Inventors: William Schmidt, Newport, MI (US); Daniel M. Swain, Wyandotte, MI (US)

(73) Assignee: Mirror Lite, Rockwood, MI (US)

( * ) Notice: Subject to any disclaimer, the term of this patent is extended or adjusted under 35 U.S.C. 154(b) by 0 days.

(21) Appl. No.: 11/532,322

(22) Filed: Sep. 15, 2006

(65) Prior Publication Data
US 2007/0008637 A1    Jan. 11, 2007

Related U.S. Application Data

(63) Continuation of application No. 10/708,123, filed on Feb. 10, 2004, now Pat. No. 7,134,759.

(51) Int. Cl.
*G02B 5/10* (2006.01)

(52) U.S. Cl. ........................ 359/868; 359/866

(58) Field of Classification Search ........... 359/866, 359/868
See application file for complete search history.

(56) References Cited

U.S. PATENT DOCUMENTS

| | | | | |
|---|---|---|---|---|
| 4,730,914 A | * | 3/1988 | Stout | 359/868 |
| 5,084,785 A | * | 1/1992 | Albers et al. | 359/868 |
| 6,227,674 B1 | * | 5/2001 | Englander | 359/853 |

* cited by examiner

*Primary Examiner*—Alessandro Amari
(74) *Attorney, Agent, or Firm*—John A. Artz; Dickinson Wright PLLC

(57) ABSTRACT

A mirror assembly is provided having a base member and a dome lens member. The dome lens member has a varying dome lens radius of curvature with a center surface portion having a center surface radius of curvature and a peripheral surface portion having a peripheral surface radius of curvature greater than the center surface radius of curvature.

17 Claims, 3 Drawing Sheets

ELLIPSOID VEHICULAR MIRROR

CROSS REFERENCE TO RELATED APPLICATIONS

This is a continuation of U.S. application Ser. No. 10/708,123 filed on Feb. 10, 2004.

TECHNICAL FIELD

The present invention relates generally to an exterior automotive mirror assembly, and, more particularly to front-end mounted exterior automotive ellipsoid mirrors.

BACKGROUND OF THE INVENTION

Automotive mirror assemblies can play a vital role in vehicle operation. Placement of the vehicle operator within the vehicle structure often makes direct line-of-sight to surrounding vehicle areas impractical. Yet such visual inspections of surrounding areas can provide the vehicle operator with information necessary for proper vehicle operation. As vehicle size increases, so often does the difficulty of accurate visual inspections. Vehicles, such as school buses and commercial vans, often utilize increased vehicle sizes while requiring visual inspection of areas in front of and to the side of the vehicle. To this end, it is well known that vehicle mirrors may be front-end mounted to the vehicle to provide the widest possible field of view around the vehicle.

Early attempts at widening the operator's field of view focused on the use of convex mirrors. By increasing the size of the convex mirror, it was discovered that the field of view could be increased. Unfortunately, increasing the size of the convex mirror quickly becomes inefficient as the mirror itself begins to become an obstruction to forward viewing. To accommodate the need for increased field of view, without negatively impacting mirror size, it is known that a domed mirror lens may incorporate a varying radius of curvature along one of either the major or minor axis. The varying radius of curvature achieves a compacted wide field of view or viewing area within minimal space such that the driver can look forward of the vehicle with minimal blockage of vision. These mirrors with varying radius of curvature along one axis are commonly referred to as cross-over mirrors.

Although the use of cross-over mirror designs has proven highly successful in the increase of viewing area while minimizing mirror size, present designs still can incorporate drawbacks. One of the drawbacks of these common cross-over mirror designs results from the reflection of the vehicle itself within the mirror. In many designs, the vehicle reflection is positioned within the center of the mirror and fills a significant amount of valuable viewing space. This results in a reduction of useful mirror surface area since the user does not commonly monitor reflection of the vehicle itself. Furthermore, images reflected in the mirror along the front and side of the vehicle often appear in the perimeter regions of the mirror. The reflections in the perimeter regions are commonly reduced in proportion due to decreasing surface radius of curvature in these regions of the mirror. This can result in undesirably distorted images with reduced image proportions such as long thin images. The reduction in image proportion can result in an increased strain on the driver to differentiate the objects reflected in these regions.

It would, therefore, be highly desirable to have a mirror assembly that reduces the vehicle reflection in the mirror reflective surface area such that an increase in useful surface area is achieved. It would further be highly desirable to have a mirror assembly that improves image proportional reflection along the mirror perimeter to facilitate improved recognition.

SUMMARY OF THE INVENTION

A vehicle mirror assembly is provided comprising a base. The base comprises a first base portion defined by a first base longitudinal line and a first base periphery. The first base portion has a first base radius of curvature. The base further includes a second base portion defined by the first base longitudinal line and a second base periphery. The second base portion has a second base radius of curvature. A dome lens conforms to the base. The dome lens has a varying dome lens radius of curvature. The dome lens comprises a center surface portion having a center surface radius of curvature. The center surface radius is corresponding to a position on said dome lens aligned with a first base longitudinal midpoint to said dome lens and is perpendicular to the first base longitudinal line. A peripheral surface portion has a peripheral surface radius of curvature corresponding to the first base periphery. The peripheral surface radius of curvature is greater than the center surface radius of curvature.

Other features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
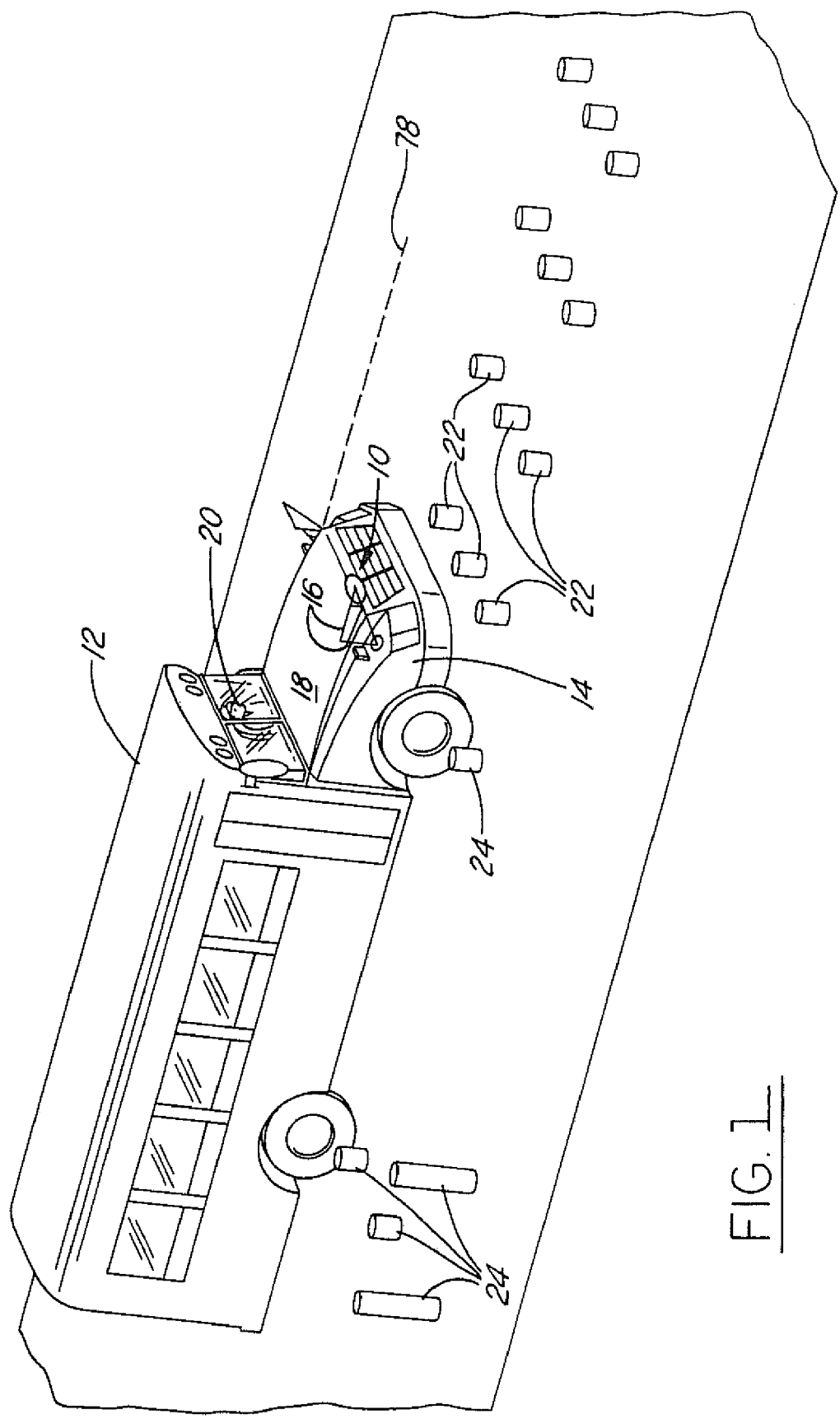
FIG. 1 is a top view illustration of an ellipsoid vehicle mirror assembly in accordance with the present invention, the ellipsoid vehicle mirror assembly illustrated mounted on a vehicle.

Referring now to FIG. 1, which is an illustration of an ellipsoid vehicle mirror assembly 10 in accordance with the present invention, the ellipsoid vehicle mirror assembly 10 illustrated mounted on a vehicle 12. Although the ellipsoid vehicle mirror assembly 10 is illustrated mounted on a school bus, it should be understood that the present invention may be utilized in combination with a wide variety of vehicles 12 for a wide variety of applications. The ellipsoid vehicle mirror assembly 10 is well suited for vehicles such as trucks and vans. Similarly, although the ellipsoid vehicle mirror assembly 10 may be mounted in a variety of locations on the vehicle 12, one embodiment contemplates mounting the ellipsoid vehicle mirror assembly 10 in the front corner 14 of the vehicle 12 using mounting brackets 16 to attach the ellipsoid vehicle mirror assembly 10 to the vehicle surface 18.

Figure 2:
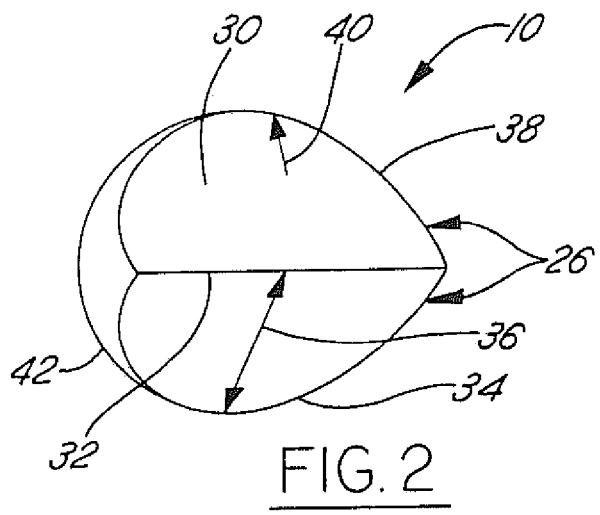
FIG. 2 is rear perspective view illustration of the ellipsoid vehicle mirror assembly illustrated in FIG. 1.

The ellipsoid vehicle mirror assembly 10 is preferably mounted to the front corner 14 of the vehicle 12 such that it can provide the driver 20 with a field of view that encompasses both front-of-vehicle objects 22 and side-of-vehicle objects 24. The present invention provides advantages to the driver's 20 field of view by improving the reflected view of the front-of-vehicle objects 22 and the side-of-vehicle objects 24. This is accomplished through the unique geometric configuration of the ellipsoid vehicle mirror assembly 10. The ellipsoid vehicle mirror assembly 10 is comprised of a base 26 (see FIG. 2). The base 26 in turn is comprised of a first base portion 28 and a second base portion 30. In the particular embodiment illustrated, the first base portion 28 and the second base portion 30 are perpendicular to one another. It should be understood, however, that in alternate embodiments the base portions 28,30 may be formed parallel (see FIG. 3) or at any of a variety of angles relative to each other.

The first base portion 28 is defined by a first base longitudinal line 32 and a first base periphery 34. The first base periphery 34 is defined by a first base radius of curvature 36. The second base portion 30 is defined by the first base longitudinal line 32 and a second base periphery 38 having a second base radius of curvature 40. It should be understood that when the base portions 28,30 are parallel, the first base longitudinal line 32 will not represent a visible dividing point. A dome lens 42 conforms to the base 26 and includes a varying dome lens radius of curvature 44. The dome lens 42 is a reflective convex surface with reflective mirror properties. A wide variety of configurations and manufacturing methodologies are known for producing such a dome lens 42 and are contemplated by the present invention.

The present mirror dome lens 42 may be manufactured from any suitable "silverized" plastic by any suitable mode such as injection molding or the like. The materials of construction are preferably selected such that upon formation there is no collapse at the central portion of the lens to thus eliminate the potential of negative curvatures and distortion thereat. Injection molding may be utilized in order to mold the lens 42 to desired specifications. It should be understood, however, that a variety of manufacturing methodologies may be utilized to implement the present invention.

Figure 4:
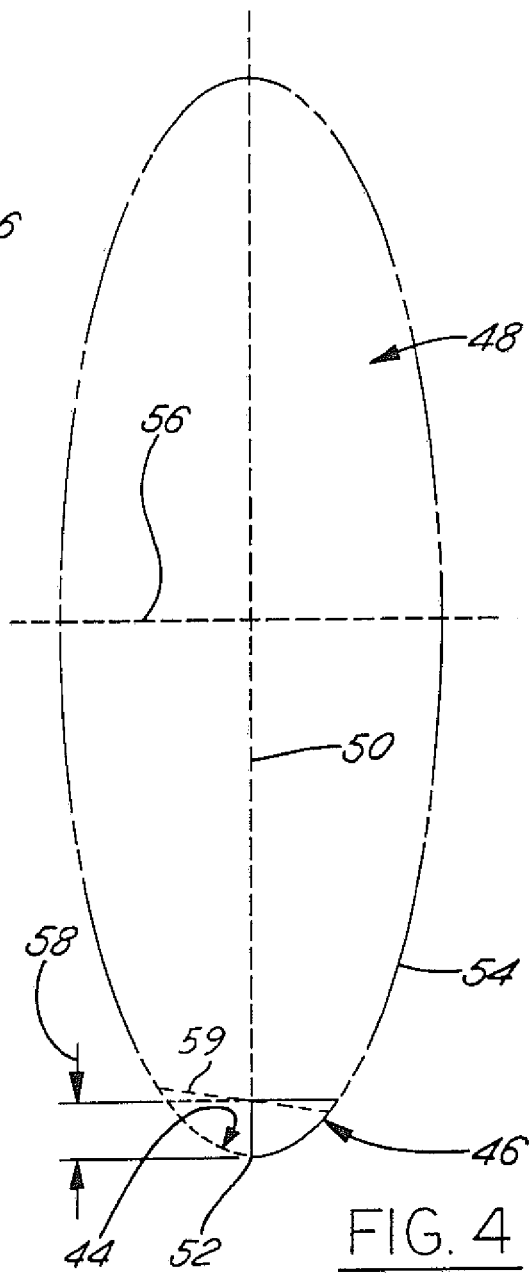
FIG. 4 is a cross-sectional view of the ellipsoid vehicle mirror assembly illustrated in FIG. 1, the view illustrating the geometric properties of the ellipsoid vehicle mirror.

The dome lens 42 is formed with a unique geometry to provide positive field of view advantages in combination with improved image proportions, This is accomplished by forming the dome lens 42 as a major-axis tip portion 46 of an ellipsoid 48 (see FIG. 4). The major-axis tip portion 46 comprises a portion of the ellipsoid 48 formed by dividing the ellipsoid 48 across the major axis 50. The major-axis portion 46 of the ellipsoid 48 preferably includes an ellipsoid tip point 52 as defined where the major axis 50 intersects the ellipsoid perimeter 54. Although a wide variety of ellipsoids 48 are contemplated by the present invention, one embodiment contemplates the use of an ellipsoid 48 with an approximately 82 inch major axis 50 and a 29 inch minor axis 56. In this arrangement, the minor axis 56 is contemplated to be less than half of the major axis 50. The dome depth 58, in this example, is approximately 4.3 inches. It should be understood that these dimensions and proportions are illustrative and are not meant as limitations to the present invention except as specifically claimed.

Figure 3:
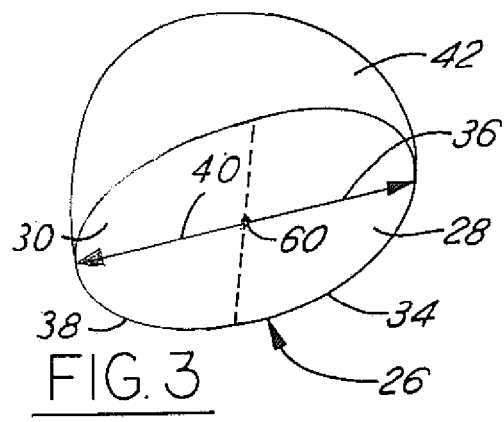
FIG. 3 is an alternate embodiment illustration of the ellipsoid vehicle mirror illustrated in FIG. 2.
Figure 5:
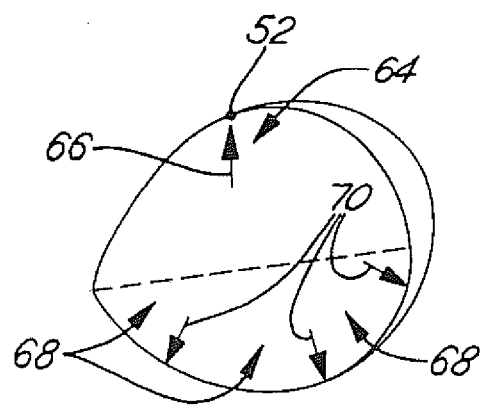
FIG. 5 is a front perspective view of the ellipsoid vehicle mirror illustrated in FIG. 2.

Although the ellipsoid 48 may be dimensioned and divided in a variety of fashions, one embodiment contemplates that the first base portion 28 divides the ellipsoid 48 perpendicular to the major axis 50. In this embodiment the first base radius of curvature 36 is constant. When the second base portion 30 is perpendicular to the first base portion 28 (as in FIG. 2) the second base portion is then coincident with the major axis 50 and the ellipsoid tip point 52 is positioned on the second base periphery 38 at a position perpendicular to the first base longitudinal midpoint 60. In this embodiment, the ellipsoid tip point 52 is coincident with the second base periphery 38 and the second base radius of curvature 40 is varying. In the embodiment (see FIG. 3) wherein the first and second base portions 28,30 are parallel, both first and second base radius of curvature 36,40 are constant and the ellipsoid tip point 52 is positioned in between the first base periphery 34 and the second base periphery 38. It should be understood that the first and second baseline radius of curvatures 36, 40 in FIG. 3 are only constant when the ellipsoid 48 is divided perpendicular to the major axis 50. By using a non-perpendicular intersection 59 (see FIG. 4), the first and second baseline radius of curvatures 36, 40 in FIG. 3 would both vary. In still another contemplated embodiment (see FIG. 5), the ellipsoid tip point 52 is still between the first base periphery 34 and the second base periphery 38, however both the first base radius of curvature 36 and the second base radius of curvature 40 are varying. In such a case, it is conceived that the angle between the first and second baseline portions 28, 30 need not be perpendicular but may encompass a variety of angles. In addition, square cut bisected base and square of sliver formations are also contemplated.

Figure 6:
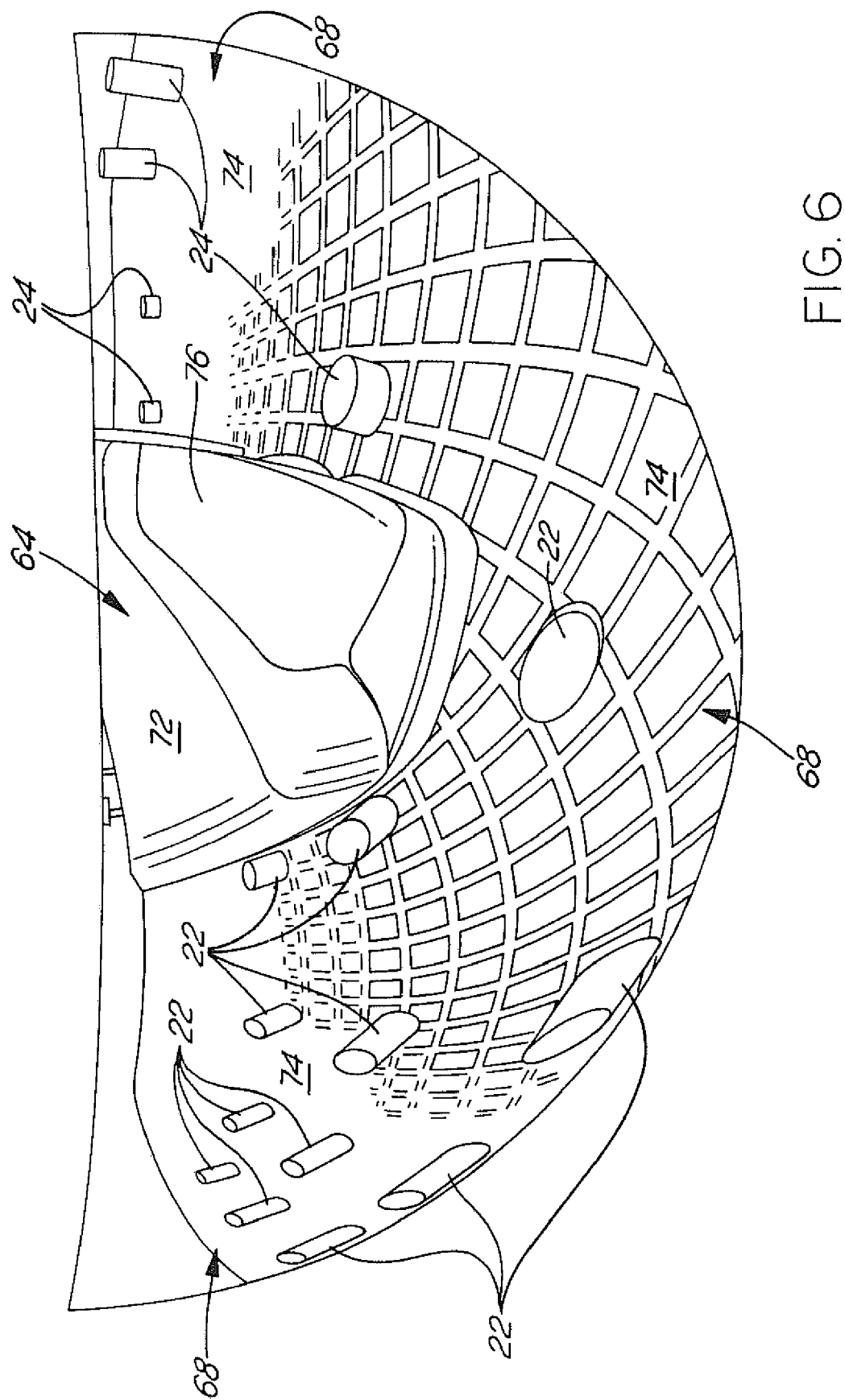
FIG. 6 is a perspective view illustration of an ellipsoid vehicle mirror as shown in FIG. 1, the detail illustrating the proportional image views.

The resultant described geometry results in a varying dome lens radius of curvature 44. The varying radius of curvature 44 results in a the dome lens 42 having a center surface portion 64 (see FIGS. 5 and 6) having a center surface radius of curvature 66 and a peripheral surface portion 68 having a peripheral radius of curvature 70. The center surface radius of curvature 66 corresponds to a position on the dome lens 42 aligned with the first base longitudinal midpoint 60 in a direction perpendicular to the first base longitudinal line 32. The peripheral surface portion 68 corresponds to the first base periphery 34. The peripheral surface radius of curvature 70 is greater than the center surface radius of curvature 66. This in turn generates a first proportion image view 72 coincident with the center surface portion 64 and a second proportion image view 74 coincident with the peripheral surface portion 68. The smaller radius of curvature of the center surface portion 64 therefore results in a view generating smaller image proportions than the peripheral surface portion 68 (see FIG. 6). In this fashion, when the mirror assembly 10 is positioned 10 in the front corner 14 of the vehicle 12, it is preferably positioned such that the vehicle reflection 76 is reflected in the first proportion image view 72. The second proportion image view 74 preferably reflects both the front-of-vehicle objects 22 and the side-of-vehicle objects 24. Thus the vehicle 12 itself takes up a smaller portion of the mirror assembly 10 while the front-of-vehicle objects 22 and the side-of-vehicle objects 24 are reflected with improved proportions. As shown in FIG. 1, when the perpendicular base embodiment is utilized with a constant first base radius of curvature 36, it is preferable that the second base portion 30 is approximately parallel with the vehicle hood plane 78 and the ellipsoid tip point 46 is positioned closer to the vehicle 12 than the first base periphery 38. In this fashion, the vehicle 12 is properly relegated to the first proportion image view 72 while the second proportion image view 74 covers the entire range of front-of-vehicle to side-of vehicle.

While particular embodiments of the invention have been shown and described, numerous variations and alternative embodiments will occur to those skilled in the arm. Accordingly, it is intended that the invention be limited only in terms of the appended claims.

What is claimed is:

1. A vehicle mirror assembly comprising:
   a base comprising:
   a first base portion defined by a first base longitudinal line and a first base periphery, said first base portion having a first base radius of curvature; and
   a second base portion defined by said first base longitudinal line and a second base periphery, said second base portion having a second base radius of curvature; and
   a dome lens conforming to said base, said dome lens having a varying dome lens radius of curvature, said dome lens comprising:
   a center surface portion having a canter surface radius of curvature, said center surface radius corresponding to a position on said dome lens aligned with a first base longitudinal midpoint to said dome lens, said center surface radius perpendicular to said first base longitudinal line; and
   a peripheral surface portion having a peripheral surface radius of curvature, said peripheral surface radius of curvature corresponding to said first base periphery, said peripheral surface radius of curvature greater than said center surface radius of curvature.

2. A vehicle mirror assembly as described in claim 1, wherein said second base portion is perpendicular to said first base portion.

3. A vehicle mirror assembly as described in claim 1, wherein said center surface portion forms a first proportion image view and said peripheral surface portion forms a second proportion image view, said first proportion image view generating smaller image proportions than said second proportion image view.

4. A vehicle mirror assembly as described in claim 1, wherein said center surface portion is positioned between said first base periphery and said second base periphery.

5. A vehicle mirror assembly as described in claim 1, wherein a dome depth is less than one third of a dome width.

6. A vehicle minor assembly as described in claim 1, wherein said first base radius of curvature is constant.

7. A vehicle mirror assembly as described in claim 1, wherein said dome lens comprises a major axis tip portion of an ellipsoid.

8. A vehicle mirror assembly as described in claim 7, wherein:
   said first base portion divides said ellipsoid perpendicular to a major axis of said ellipsoid; and
   said second base portion divides said ellipsoid parallel to said major axis of said ellipsoid.

9. A vehicle mirror assembly as described in claim 7, wherein said major axis tip portion comprises a dome depth less than one tenth of a major axis length of said ellipsoid.

10. A vehicle mirror assembly as described in claim 7, wherein said ellipsoid includes a minor axis length less than half of a major axis length.

11. A minor assembly comprising:
    a base member;
    a dome lens member attached to said base member, said dome lens member having a varying radius of curvature and comprising a major axis tip portion of an ellipsoid, said dome lens member comprising:
    a center surface portion having a center surface radius of curvature; and
    a peripheral surface portion having a peripheral surface radius of curvature, said peripheral surface radius of curvature greater than said center surface radius of curvature;
    wherein said center surface portion forms a first proportion image view and said peripheral surface portion forms a second proportion image view, said first proportion image view generating smaller image proportions than said second proportion image view.

12. A mirror assembly as described in claim 11 wherein a dome depth is less than one third of a dome width.

13. A vehicle mirror as described in claim 11 wherein said major axis tip portion comprises a dome depth less than one tenth of a major axis length of said ellipsoid.

14. A vehicle mirror assembly as described in claim 11 wherein said ellipsoid includes a minor axis length less than half of a major axis length.

15. A mirror assembly comprising:
    a base member; and
    a dome lens member attached to said base member;
    said base dome lens member comprising a major axis tip portion of an ellipsoid, said major axis tip portion formed by dividing said ellipsoid across a major axis, said dome lens member generating a first proportion image view and a second proportion image, said first proportion image view generating smaller image proportions than said second proportion image view, said first proportion image view positioned at an ellipsoid tip point.

16. A mirror assembly as described in claim 15 wherein said ellipsoid is divided perpendicular to said major axis and then further divided parallel to said major axis to form said major axis tip portion.

17. A mirror assembly as described in claim 15, wherein said ellipsoid includes a minor axis length less than half of a major axis length.

* * * * *